United States Patent [19]
Kalonji et al.

[11] Patent Number: 5,402,510
[45] Date of Patent: Mar. 28, 1995

[54] METHOD OF PREPARING AN OPTICAL FIBER WITH MULTIPLE LENSES TO OPTIMIZE COUPLING WITH A PHOTOTRANSDUCER, AND AN OPTICAL SYSTEM OBTAINED THEREBY

[75] Inventors: Ndiata Kalonji, Irvy S/Seine; Jack Semo, Palaiseau, both of France

[73] Assignee: France Telecom, Paris, France

[21] Appl. No.: 166,922

[22] Filed: Dec. 14, 1993

[30] Foreign Application Priority Data

Dec. 15, 1992 [FR] France .................. 92 15089

[51] Int. Cl.⁶ .................. G02B 6/32; G02B 6/25; G02B 6/42
[52] U.S. Cl. .................. 385/33; 65/37; 65/387; 359/721; 385/93
[58] Field of Search .................. 385/31, 33, 74, 93, 385/123, 124; 359/662, 668, 720, 721, 796, 797; 65/2, 3.1, 3.11, 3.2, 37–39, 60.1, 60.2

[56] References Cited
U.S. PATENT DOCUMENTS

| | | | |
|---|---|---|---|
| 3,910,677 | 10/1975 | Becker et al. | 385/33 |
| 3,932,184 | 1/1976 | Cohen et al. | 385/33 |
| 4,067,937 | 1/1978 | Unno et al. | 264/1.5 |
| 4,137,060 | 1/1979 | Timmermann | 65/31 |
| 4,143,940 | 3/1979 | Khoe | 385/33 |
| 4,193,663 | 3/1980 | Timmermann | 385/33 |
| 4,243,399 | 1/1981 | Khoe et al. | 65/37 |
| 4,370,021 | 1/1983 | Khoe et al. | 385/33 |
| 4,398,790 | 8/1983 | Righini et al. | 385/33 |
| 4,456,330 | 6/1984 | Bludau | 385/33 |
| 4,490,020 | 12/1984 | Sakaguchi et al. | 385/33 |
| 4,671,609 | 1/1987 | Khoe et al. | 385/33 |
| 4,678,268 | 7/1987 | Russo et al. | 385/33 |
| 4,721,353 | 1/1988 | Khoe et al. | 385/33 |
| 4,737,006 | 4/1988 | Warbrick | 385/33 |
| 4,744,620 | 5/1988 | Ueno et al. | 385/34 |
| 4,778,247 | 10/1988 | Carpenter | 362/32 |
| 4,784,466 | 11/1988 | Khoe et al. | 385/33 |
| 4,795,227 | 1/1989 | Chande | 385/33 |
| 4,818,263 | 4/1989 | Mitch | 65/2 |
| 4,824,195 | 4/1989 | Khoe | 385/33 |
| 4,867,776 | 9/1989 | Sharp | 65/2 |
| 4,883,333 | 11/1989 | Yanez | 385/33 |
| 4,932,989 | 6/1990 | Presby | 65/2 |
| 4,935,939 | 6/1990 | Liau et al. | 372/98 |
| 5,011,254 | 4/1991 | Edwards et al. | 385/33 |
| 5,037,174 | 8/1991 | Thompson | 385/33 |
| 5,101,457 | 3/1992 | Blonder et al. | 385/33 |
| 5,204,781 | 4/1993 | Ishibai et al. | 359/708 |
| 5,271,077 | 12/1993 | Brockman et al. | 385/31 |

FOREIGN PATENT DOCUMENTS

| | | | |
|---|---|---|---|
| 0155379 | 11/1984 | European Pat. Off. | G02B 6/42 |
| 0260742 | 3/1988 | European Pat. Off. | G02B 6/26 |
| 2548391 | 1/1985 | France | G02B 7/20 |
| 2681437 | 3/1993 | France | G02B 6/25 |
| 3407413 | 8/1985 | Germany | G02B 6/42 |
| 3632743A1 | 3/1988 | Germany | G02B 6/32 |
| 1586188 | 3/1981 | United Kingdom | G02B 3/10 |

OTHER PUBLICATIONS

Applied Optics, H. M. Presby, A. F. Benner, and C. A. Edwards, vol. 29, No. 18, pp. 2692–2695, Jun. 20, 1990.
Journal of Quantum Electronics, Jun-Ichi Yamada, Yasuji Murakami, Jun-Ichi Sakai and Tatsuya Kimura, vol. QE-16, No. 10, pp. 1067–1072, Oct. 1980.
Patent Abstracts of Japan, vol. 9, No. 262 (P-398) Oct. 19, 1985 & JP-A-60 111 208 (Matsushita Denki Sangyo) Jun. 17, 1985.
Patent Abstracts of Japan, vol. 7, No. 282 (P-243) Dec. 16, 1983 & JP-A-58 158 620 (Hitachi Seisakusho) Sep. 20, 1983.

*Primary Examiner*—Frank Gonzalez
*Attorney, Agent, or Firm*—Blakely, Sokoloff, Taylor & Zafman

[57] ABSTRACT

The present invention relates to a method of preparing an optical fiber for optimum coupling with a phototransducer, comprising the following steps: cleaving an end surface on an optical fiber; and depositing a succession of convex lenses on said cleaved surface over the core of the fiber, the lenses being in axial alignment and of decreasing radii of curvature on going away from the fiber. The present invention also provides a system obtained by implementing the method.

15 Claims, 5 Drawing Sheets

STATE OF THE ART

PHOTOTRANSDUCER TO FIBER DISTANCE

METHOD OF PREPARING AN OPTICAL FIBER WITH MULTIPLE LENSES TO OPTIMIZE COUPLING WITH A PHOTOTRANSDUCER, AND AN OPTICAL SYSTEM OBTAINED THEREBY

FIELD OF THE INVENTION

The present invention relates to the field of optical fibers that are to be coupled with phototransducers.

In the context of the present invention, the term "phototransducer" is used to cover optical receiver systems suitable for transforming a received optical signal coming from an optical fiber into an electrical signal, and optical transmitter signals suitable for generating an optical signal for application to an optical fiber. Such optical systems may be formed by optical integrated circuits.

BACKGROUND OF THE INVENTION

Numerous proposals have already been made to place a lens facing an optical fiber for the purpose of providing coupling between the fiber and a phototransducer.

By way of example, the following documents teach various different ways of using such coupling lenses: DE-A-3632743; FR-A-2548392; IEEE Journal of Quantum Electronics, Vol. 16, No. 10, October 1980, New York, U.S., pages 1067–1072; Yamada et al., "Characteristics of a hemispherical microlens for coupling between a semiconductor laser and single-mode fiber" pages 1067–1068; Patent Abstracts of Japan, Vol. 9, No. 262; and Applied Optics, Vol. 29, No. 18, Jun. 20, 1990, New York, U.S., pages 2692–2695.

The present inventors have already proposed improvements to those known devices in French patent application No. 91 11493 filed Sep. 18, 1991 and entitled (in translation) "Improved optical fiber for coupling with a phototransducer, and method of preparation".

Thus, accompanying FIG. 1 shows a device in accordance with the teaching of prior patent application No. FR-91 11493.

In accompanying FIG. 1, there can be seen an optical fiber 10 comprising a core 12 surrounded by cladding 14, together with a phototransducer 20 in alignment with the core 12 and a microlens 30 welded onto the cleaved end face 16 of the optical fiber 10 over its core 12.

A detailed study has shown that the parameters which influence the optical power coupled in a fiber of given type and provided with a collecting lens 30 are numerous, and comprise, in particular:

the wavelength of the radiation;
the angular aperture of the beam;
the radius of curvature of the collecting lens 30;
the accuracy with which it is centered on the core of the fiber 10;
the distance dw between the phototransducer 20 and the lens 30; and
the transverse positioning offset of the phototransducer 20 facing the core 12 of the fiber (assembly error).

OBJECTS AND SUMMARY OF THE INVENTION

An object of the present invention is now to improve the known prior systems.

According to the present invention, this object is achieved by a method comprising the following steps:
cleaving an end surface on an optical fiber; and
depositing a succession of convex lenses on said cleaved surface over the core of the fiber, the lenses being in axial alignment and of decreasing radii of curvature on going away from the fiber.

According to an advantageous characteristic of the present invention, the various lenses are deposited on the cleaved surface by successively reiterating the following sequence of steps as many times as there are required lenses:

a) stretching a length of optical fiber;
b) aligning the resulting tip on the axis of the core of the fiber for the first lens, and subsequently on the axis of the front lens, and making contact with a small amount of pressure;
c) surface welding the tip that has been put into contact;
d) applying traction to the tip to leave behind a calibrated needle; and
e) making a lens by controlled melting of the needle obtained in this way.

The present invention also provides systems obtained by implementing the above method.

BRIEF DESCRIPTION OF THE DRAWINGS

Other characteristics, objects, and advantages of the present invention appear on reading the following detailed description with reference to the accompanying drawings given by way of non-limiting example, and in which.

MORE DETAILED DESCRIPTION

As mentioned above, the method of the present invention consists essentially:

i) in cleaving an end surface 102 of an optical fiber 100; and
ii) depositing a succession of convex lenses 220 on said cleaved surface 102 over the core 106 of the fiber, the lenses being in axial alignment and of decreasing radii of curvature on going away from the fiber 100.

Figure 3:
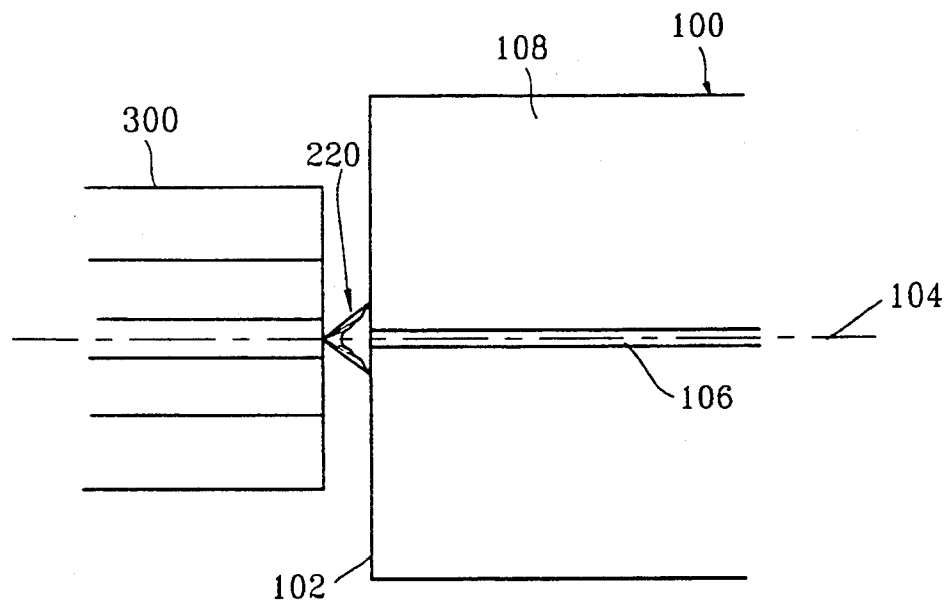
FIG. 3 is a diagrammatic axial section view through a system of the present invention that comprises three lenses on a common axis placed over the core of the fiber.

Accompanying FIG. 3 shows a monomode fiber 100 having cladding 108 surrounding the above-mentioned core 106. The cladding 108 typically has a diameter of the order of 125 $\mu$m, whereas the core 106 typically has a diameter of the order of 9 $\mu$m. The phototransducer is referenced 300.

The step of cleaving the optical fiber 100 consists in sectioning said fiber in such manner that the resulting end face 102 thereof is at least substantially plane and orthogonal to its central axis 104. The area of said cleaved end face 102 is thus equal to the cross-section of the core 106 plus the cross-section of the surrounding cladding 108.

This cleaving step may be performed using any sectioning process known to the person skilled in the art, possibly merely by curving the fiber 100 until it snaps at a nick itself made by means of a very hard cutting edge.

To deposit the first lens 220 on the cleaved end 102, over the core 106, it is preferable to proceed as follows.

Figure 4:
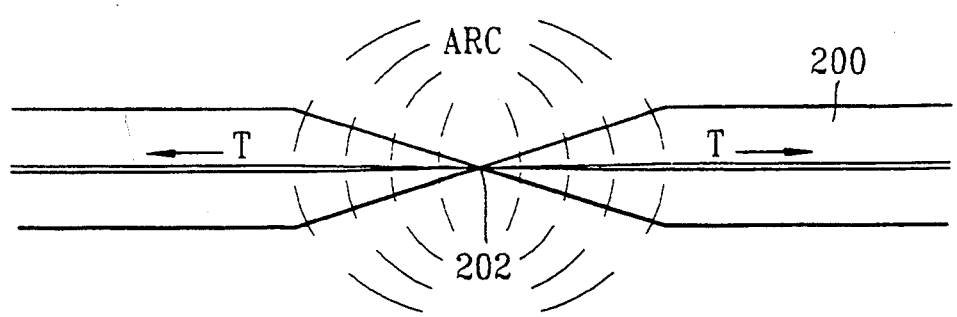
FIGS. 4 to 9 are diagrams showing various steps in the manufacture of a lens in accordance with the present invention.

As shown in FIG. 4, a small piece of another fiber 200 is stretched (traction T) axially and symmetrically under the action of an electric arc until the fiber breaks at a point 202. The piece of fiber 200 may be about 10 cm long. The stretched fiber 200 is preferably of the same kind as the cleaved fiber 100. At the end of the stretching step, two pieces of optical fiber 200 are thus obtained, each terminated by a conically tapering tip.

Figure 5:
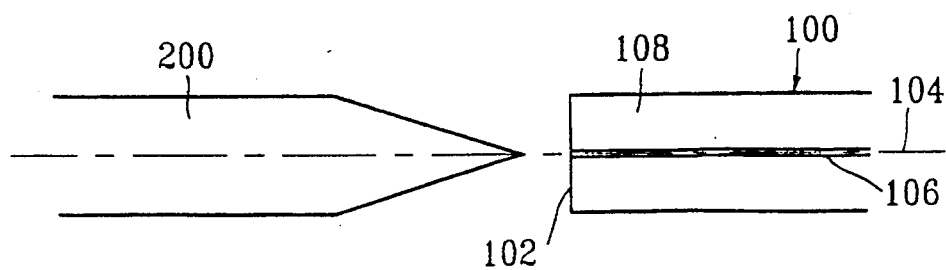

One of the stretched pieces of optical fiber 200 is then placed facing the cleaved end 102 of the fiber 100 and is put into alignment therewith, as shown in FIG. 5. This alignment may be achieved by any appropriate means, e.g. by placing the cleaved fiber 100 and the piece of stretched fiber 200 on appropriate V-supports. Known optical fiber splicing techniques commonly make use of such V-supports made of sapphire, giving accuracy of $\mu$m order. That is why the V-supports are not shown on the accompanying figures and are not described in greater detail below.

Figure 6:
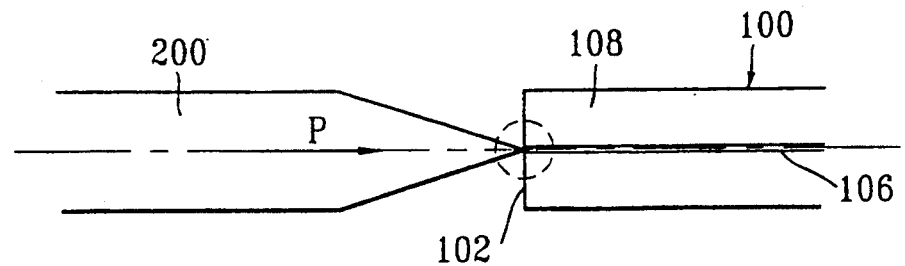

The tip of the stretched fiber 200 is then brought mechanically into contact with the core 106 of the cleaved fiber 100, and a small amount of axial pressure P is applied (as shown in FIG. 6) while conserving the previously-achieved alignment between the stretched fiber 200 and the cleaved fiber 100.

Figure 7:
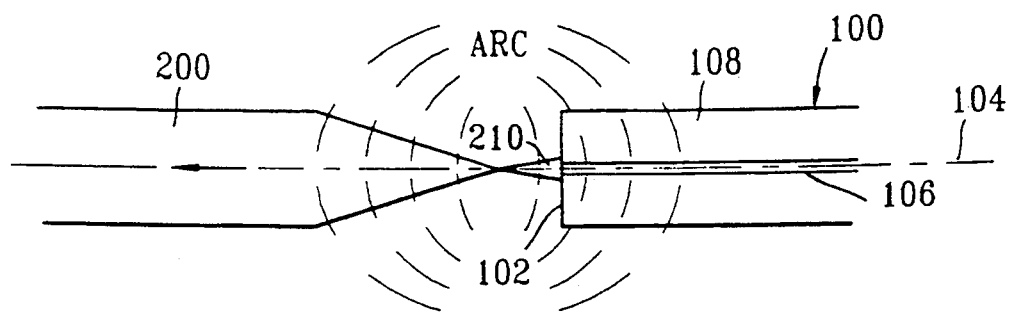
Figure 8:
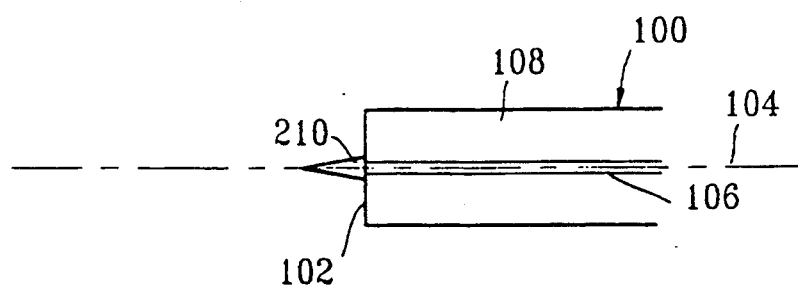

The resulting assembly is subjected to an electric arc, as shown in FIG. 7, for the purpose of obtaining rapid and low intensity melting of the tip of the stretched fiber 200. As soon as a weld appears between the tip and the core 106 of the cleaved fiber 100, the fiber 200 is withdrawn. This withdrawal of the stretched fiber 200 leads to a needle of glass 210 being left behind that is centered on the axis 104 and that is bonded to the core 106 of the cleaved fiber 100, as shown in FIG. 8.

Figure 9:
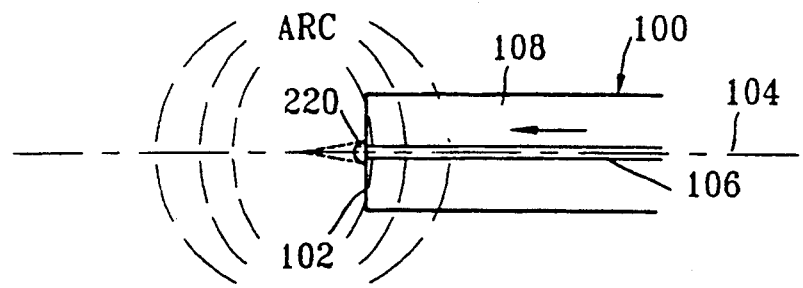

Then, as shown in FIG. 9, it remains to melt the glass needle 210 by one or more passes under a low intensity arc, so as to transform the needle 210 into a lens 220 of desired curvature.

The above-specified set of steps can be performed in a few minutes. An optical fiber 100 is thus obtained that has a cleaved end 102 together with a lens 220 welded onto said cleaved end over the core 106 of the optical fiber 100.

To make a plurality of lenses of decreasing diameter over the core 106, the above-described steps shown in FIGS. 4 to 9 should be repeated as many times as there are lenses to be deposited.

In other words, the second lens and optionally any subsequent lenses are put into place by the following sequence of steps:

a) a new piece of optical fiber is stretched;

b) the resulting tip is put into alignment with the axis of the previous lens, and is brought into contact therewith using a small amount of pressure;

c) the tip is surface welded under an electric arc;

d) a calibrated needle is left behind by pulling away the tip under the arc; and e) the resulting needle is converted into a lens by controlled melting.

It should be observed that during step a) in which a new piece optical fiber is stretched, the conical shape of the tip obtained by stretching must be controlled so that in step d) the needle which is left behind is of an appropriate size that is compatible with the radius of curvature that is desired for the new lens.

In addition, the power of the electric arc used during steps c), d), and e) must be adapted to each of those steps, otherwise there is a danger of the smaller masses of glass disappearing.

During testing, in order to obtain the desired melting of the fiber 200, the inventors have used a microwelder of the type "micro fusion splicer ms-1.008" sold by Foundation Instruments. Such a microwelder generates an electric arc.

Heating by means of an electric arc is nevertheless not essential. The arc may be replaced, for example, by heating using a power laser source, providing that precautions are taken to ensure accurate alignment between the cleaved fiber 100 and the stretched end 200 that applies the microlens 220 onto the core 106, and providing precautions are taken to ensure that the tip 200 is subjected to very rapid local melting so as to weld a glass needle 210 of appropriate dimensions onto the core 106 of the cleaved fiber 100.

It is shown below that the use of a succession of convex lenses 220 in axial alignment and having decreasing radiuses of curvature, as specified in the context of the present invention, makes it possible to provide coupling between an optical fiber and a transducer that is improved compared with the coupling that can be obtained by a simple hemispherical lens.

Figure 1:
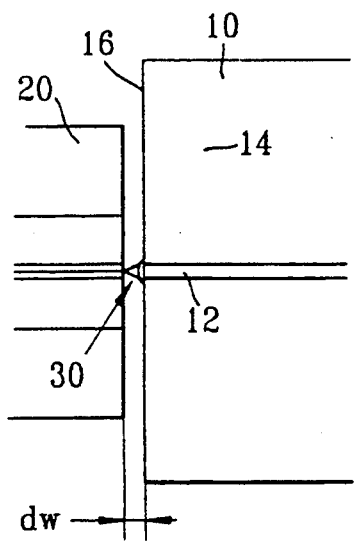
FIG. 1 is described above and is a diagrammatic axial section view of a prior art system comprising an optical fiber, a phototransducer and a collecting lens.

Firstly, the inventors have determined that in a conventional system having a simple hemispherical lens, the radius of the lens directly conditions the position and the height of the coupling maximum obtained as a function of the distance between the transducer and the fiber along the axis of the fiber and for a given angular aperture of the beam. More precisely, a simple hemispherical lens of very small radius of curvature (e.g. less than 8 $\mu$m) can collect a maximum amount of light only if the distance between the transducer and the lens remains small enough to ensure that the emission cone coincides with the numerical aperture of the lens (as shown diagrammatically in FIG. 1).

Figure 2:
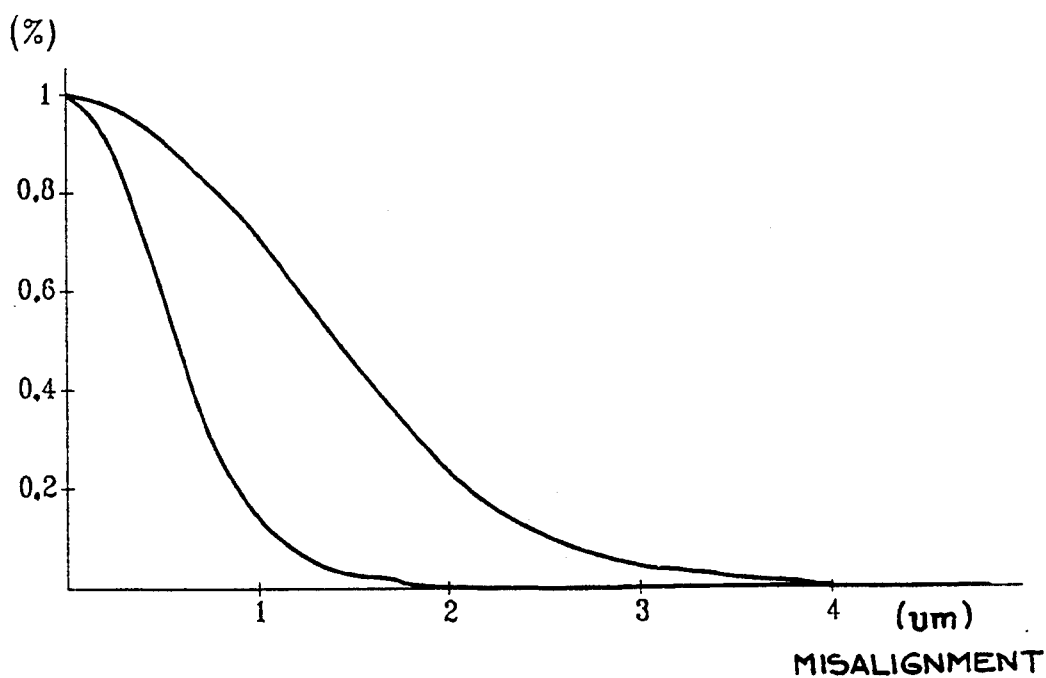
FIG. 2 shows how optical coupling between the phototransducer and the optical fiber varies as a function of misalignment between them in a plane normal to the optical axis.

Clearly this is very awkward since the fiber 10 must then be positioned at a distance dw from the phototransducer 20 that is equivalent to the radius of curvature of the order of 10 $\mu$m, and this must be done with transverse centering accuracy equal to one-tenth of a micrometer as shown by the graph of FIG. 2.

In the context of the system of the present invention, the smallest lens, i.e. the lens 220 having the smallest radius of curvature, also corresponds to the lens that is furthest away from the cleaved face 102 of the optical fiber, and it serves to collect the central portion of the emitted beam which corresponds to the energy maximum in a Gaussian beam.

The following lens 220 of larger radius of curvature engages out to its periphery with the portion of the beam that is not engaged by the preceding lens, and so on assuming there is a succession of lenses of decreasing curvatures (or increasing radii of curvature) on moving closer to the fiber 100.

For a monomode optical fiber of the 9/125 type, i.e. an optical fiber 100 having a core 106 of diameter equal to 9 μm and cladding 108 of diameter equal to 125 μm, applying a plurality of lenses in accordance with the present invention leads to a significant increase in coupling with a phototransducer 300, providing the radii of curvature of the various lenses 220 remain less than about 10 micrometers, at least for the first two lenses 220.

Figure 10:
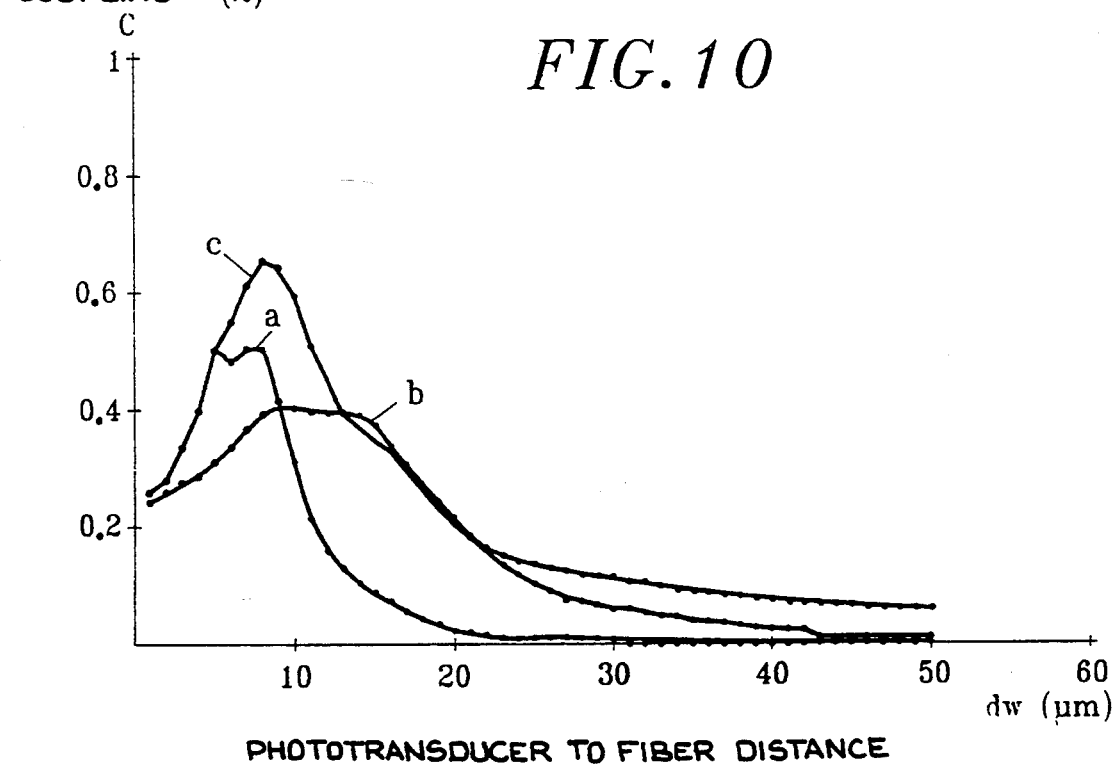
FIG. 10 shows the optical coupling obtained as a function of the distance between the phototransducer and the optical fiber.

Accompanying FIG. 10 shows the coupling coefficient obtained between an optical fiber 100 and a phototransducer 300 as a function of the distance dw between the phototransducer and the fiber along the axis 104. More precisely, FIG. 10 corresponds to the following data:

an 8/125 monomode fiber;
radius of the core 106:4 μm;
beam divergence ±45°;
refractive index of the cladding 108:1.445;
refractive index of the core 106:1.450;
wavelength of the radiation: 1.3 μm; and
refractive index of the lenses: 1.450.

More precisely still, curves 10a and 10b show the values of the coupling coefficient C as obtained with respective simple hemispherical lenses 220 deposited over the core 106, one of them having a radius of curvature of 4 μm and the other a radius of curvature of 8 μm. The curve identified by the index c in FIG. 10 corresponds to the coupling coefficient obtained by means of a pair of lenses in accordance with the present invention comprising a lens having a radius of 4 μm and a lens having a radius of 8 μm.

When curve 10c is compared with previously-mentioned curves 10a and 10b, it can be seen that the coupling coefficient C obtained by the present invention is 35% greater than the best obtained with a simple lens, and that an increase in the distance dw between the phototransducer 300 and the fiber gives rise to a smaller loss of coupling.

Figure 11:
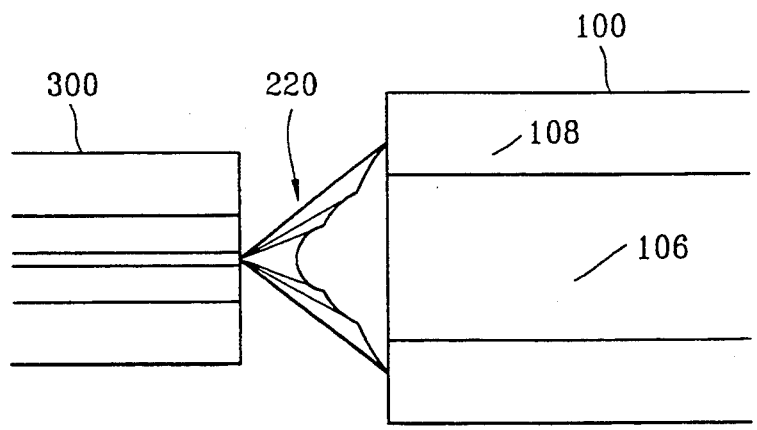
FIG. 11 is on a larger scale and shows a device in accordance with the present invention and comprising three lenses.

Naturally, the present invention is not limited to the use of a pair of lens 220 as shown in FIG. 3. Thus, in FIG. 11, there can be seen a triplet of lenses 220 over the cleaved face 102 of the optical fiber.

It is true that making a stack of hemispherical lenses of different radii all in alignment on the same axis requires a series of steps that are quite difficult to perform. However, in the context of the present invention, proposals are also made to interpose an element of multimode fiber between the series of lenses 220 and the step index monomode fiber 100, which element of multimode fiber has a graded index that makes it possible to increase the dimensions of the lenses by increasing the numerical aperture of the system.

Figure 12:
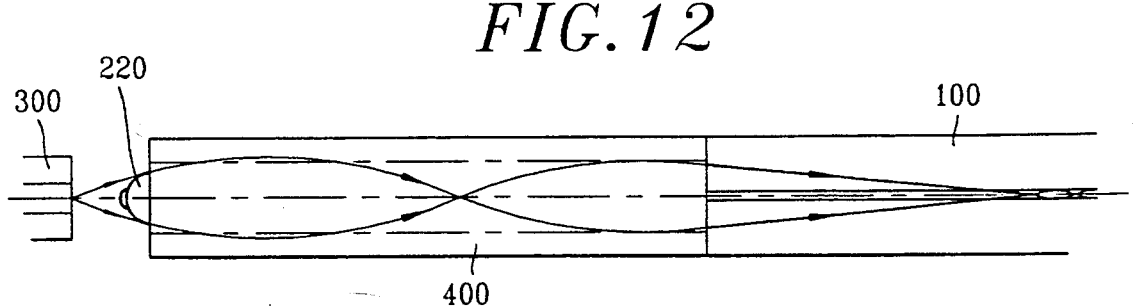
FIGS. 12 and 13 are diagrammatic axial section views showing two variant embodiments in accordance with the present invention.

Thus, accompanying FIG. 12 is a diagram showing a graded index multimode fiber element 400 interposed between the set of lens 220 and the monomode fiber 100.

The core diameter and gradient shape characteristics of the graded index multimode fiber 400 condition the periodicity with which the guided lightwave is propagated. Thus, by choosing a graded index multimode fiber element 400 of appropriate calibrated length, it is possible to obtain a pair of inlet and outlet angles such that one end exactly matches the set of lenses 220 while the other end exactly matches the fiber 100.

Figure 13:
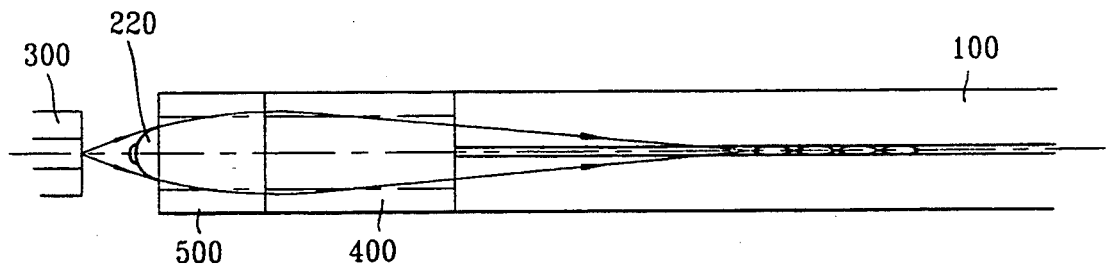

In yet another improvement, as shown in FIG. 13, to obtain better coupling between the phototransducer 300 and the fiber 100, it is possible also to interpose a calibrated length of step index multimode fiber 500 between the lens assembly 220 and the graded index multimode fiber element 400. The piece of fiber 500 serves to increase the diameter of the incident beam up to the working diameter of the fiber 400. It also provides the system with the appreciable advantage of increasing the front or working distance dw.

Naturally, when the diameter of the beam at the outlet from the lens assembly 220 coincides with the graded index multimode fiber 400, it is possible to omit the intermediate piece of step index multimode fiber 500.

The pieces of fiber 400 and 500 may be fixed to the fiber 100 by conventional splicing, using any known apparatus. To facilitate this operation, it is preferable for the fibers 100, 400, and 500 to be chosen to have the same diameter.

The interposition of a calculated length (typically a few hundreds of micrometers) of graded index multimode fiber 400 (50/125, 62.5/125, or 85/125) between the fiber 100 and the light-collecting optical system formed by the set of lenses 220 gives rise to a focusing optical system 220 having lenses whose radii of curvature now lie in the range 10 μm to 100 μm.

The optimum coupling distance with the phototransducer 300 thus becomes much less critical, since it becomes several tens of micrometers.

Tests performed by the inventors have shown an increase in coupling coefficient and an improvement in the accuracy of phototransducer-to-fiber alignment due to the superposition of lenses of increasing curvature. The resulting curve given index c in FIG. 10 shows a higher maximum in the coupling coefficient followed by a decrease that is less pronounced, thus demonstrating better coupling stability relative to the distance between the phototransducer and the fiber.

Naturally, the present invention is not limited to the particular embodiments described above, but extends to any variant that comes within the spirit of the invention.

We claim:

1. A method of preparing an optical fiber for optimum coupling with a phototransducer, comprising the following steps:
   cleaving an end surface on an optical fiber; and
   depositing a succession of convex lenses on said cleaved surface over the core of the fiber, the lenses being in axial alignment and of decreasing radii of curvature on going away from the fiber.

2. A method according to claim 1, wherein the various lenses are deposited on the cleaved surface by successively reiterating the following sequence of steps as many times as there are required lenses:
   a) stretching a length of optical fiber;
   b) aligning the resulting tip on the axis of the core of the fiber for the first lens, and subsequently on the axis of the front lens, and making contact with a small amount of pressure;
   c) surface welding the tip that has been put into contact;
   d) applying traction to the tip to leave behind a calibrated needle; and
   e) making a lens by controlled melting of the needle obtained in this way.

3. A method according to claim 1, including the step of depositing at least two lens in succession.

4. A method according to claim 1, including the step of depositing a number of lenses greater than two.

5. A method according to claim 1, wherein the radius of curvature of the lenses is less than a few tens of micrometers.

6. A method according to claim 1, further consisting in placing an element of graded index multimode fiber in line with the optical fiber and in depositing the lenses on a cleaved face of said element of graded index multimode fiber.

7. A method according to claim 1, further comprising the step of placing a piece of step index multimode fiber in line with the element of graded index multimode fiber and in placing the lenses on said length of step index multimode fiber.

8. A method according to claim 6, wherein the radii of curvature of the lenses lies in the range 10 $\mu$m to 100 $\mu$m.

9. An optical system comprising a phototransducer coupled to an optical fiber, obtained by implementing the method according to claim 1.

10. A system according to claim 9, including at least two lenses.

11. A system according to claim 9, including a number of lenses greater than two.

12. A system according to claim 9, wherein the radius of curvature of each lens is less than a few tens of microns.

13. A system according to claim 9, including an element of graded index multimode fiber interposed between the set of lenses and the monomode fiber.

14. A system according to claim 13, further including a piece of step index multimode fiber between the set of lenses and the element of graded index multimode fiber.

15. A system according to claim 13, wherein the radii of curvature of the lenses lie in the range 10 $\mu$m to 100 $\mu$m.

* * * * *